Jan. 28, 1936.  F. REID ET AL  2,028,920
LABELING AND WRAPPING MACHINE
Filed Jan. 13, 1932  10 Sheets-Sheet 6

INVENTORS
BY
ATTORNEYS

Jan. 28, 1936.  F. REID ET AL  2,028,920
LABELING AND WRAPPING MACHINE
Filed Jan. 13, 1932  10 Sheets-Sheet 10

INVENTORS
Foratus Reid
Henry Huttage
BY
Allen Allen
ATTORNEYS

Patented Jan. 28, 1936

2,028,920

UNITED STATES PATENT OFFICE 2,028,920

LABELING AND WRAPPING MACHINE

Forestus Reid, Cincinnati, and Henry Heitlage, St. Bernard, Ohio, assignors to The Procter & Gamble Company, Cincinnati, Ohio, a corporation of Ohio Application January 13, 1932, Serial No. 586,278

14 Claims. (Cl. 93—2)

Our invention relates to labeling and wrapping machines, and particularly to such machines as are adapted to label and wrap cans or cylindrical containers.

Labeling and wrapping machines have been in use for a number of years, in which the containers to be labeled and wrapped are fed into the labeling and wrapping units from a chute conveyor down which the containers roll, or on which they are conveyed in a rolling position. There are certain semi-liquid products, such as lard substitutes and the like, which are filled into the cans or containers in a semi-liquid condition, and in which containers the product, after setting for a definite period, becomes solidified. Between the time of the filling of the cans and their being conveyed to the labeling and wrapping machines, it has been customary to pass the packages on long conveyors to enable the material to set before the cans are labeled and wrapped. If the material has not set at the time the cans are labeled and wrapped, and the cans are conveyed through the labeling and wrapping machines while lying on their sides, the material smudges against the lid and solidifies in this manner so that when the can is opened there is a smudge of the material solidified on the can cover. This is undesirable, and, as has been stated, when the ordinary type of labeling and wrapping machine in which the cans are rolled on their sides through the machines has been used, long conveyors on which the cans sit upright have been required. These conveyors have taken up a great deal of space and have increased the cost of handling and packaging the product.

It is one of the principal objects of our invention to provide a labeling and wrapping machine unit in which the cans pass through the machines while in upright position, so that regardless of whether the material has or has not set, there will be no smudging of the product against the inner surface of the lid.

Another object of our invention is the provision of a labeling or wrapping machine unit for cans or cylindrical containers, in which the supply of labels or wrappers may be replenished without shutting down the machine and requiring discontinuance of the labeling or wrapping during the time when additional labels or wrappers are placed in feeding position. In wrapping cans, it is old to pass the can along on a conveyor, to place adhesive on the side of the can, to move the can into position where it engages an end of a wrapper, and to then cause the wrapper to be wound around the can by the rolling movement of the can. In feeding cans to a wrapping machine, we have found that to avoid spoilage of wrappers and improper application of the wrappers to the cans, it is very important that the timing be exact. If adhesive is applied to the side wall of the can and the can then does not approach the wrapper which it is to withdraw from the supply so that the adhesive band will register with the near end of the wrapper, an unsatisfactory wrapping job will result.

We have found that in wrapping cans a most satisfactory timing arrangement will result only when the cans are fed in with a definitely timed feeding device, such as a sprocket, in which the cans are retained within the grooves between the sprocket projections. Even with such a feeding device, we have further found that if the cans move along the conveyor belt singly, even a sprocket feeding device will throw a can slightly in advance if the can is not held back and fed to the sprocket hopper with such a movement that the turning of the sprocket gives to the can all the impetus to cause its movement into the wrapping machine.

In other words, if we have a wrapping machine with a timing sprocket feed, and cans are fed into the sprocket feed with the momentum which they have acquired while moving along the conveyor to the feeder, a little additional momentum carries on after the can is discharged from the feeder and it runs ahead and so does not register properly with the wrapper which it is to pick up.

It is our object, therefore, to provide mechanism in which a series of moving cans to be wrapped will not feed into the sprocket feeder unless there is an accumulated supply of more than one can waiting on the conveyor to be picked up by the hopper feed.

We have described our invention as applying to labeling and wrapping machine units, but it should be understood that the mechanical combinations such, for example, as the device by which labels or wrappers may be replenished without stoppage of the machine and the device for holding back cans so as to insure perfect registry in the machine, apply either to what are ordinarily known as labeling machines, or to what are usually called wrapping machines. A labeling machine is ordinarily referred to as a machine for applying a sheet to the side walls of the can only, and a wrapping machine is ordinarily referred to as a machine which not only encloses the sides of the can, but also extends up and down over the top and bottom of the can to completely enclose it in its wrapper.

It should further be understood that our invention in providing a labeling or wrapping machine in which the can is fed through the machine in upright position, applies either to a labeling machine or to a wrapping machine, or to a combination of the two units, such as we will hereinafter describe.

Our complete can labeling and wrapping machine is composed of two distinct units, each performing one step in the operation of labeling and wrapping a can or package.

In the description of the parts that follow, the labeling unit and the wrapping unit of the machine are shown separately, the first unit being the labeling mechanism, in which the base of the machine is shown at 1, supporting a pair of upper and lower rails 2 and 3. At the extreme outer ends of these rails brackets 4 carry an adjustable bearing 5. Mounted in the bearings 5 are shafts 5a and 17. Secured to each of these shafts are pairs of grooved pulleys 6, the grooved pulleys carrying continuous belts 7.

An electric motor 8 is provided which drives a gear reduction unit 9, the gear reduction unit carrying on its left hand side a sprocket wheel 9a. Mounted on the under side of the lower rail 4 are brackets 10 and 11. These brackets have bearings which support the main drive shaft 12. Mounted on this drive shaft 12 is a sprocket gear 13, having a chain 14 driven from the sprocket gear 9a on the reduction unit 9. The shaft 12 has at its right hand end a bevel gear 15. Mounted across the machine underneath the frame member 2, is a shaft 16. This shaft 16 has on its end next to the shaft 12, a bevel gear 17a meshing with gear 15. On the opposite end of the shaft 16 is a bevel pinion 17b. Mounted in bearings on the rear of the frame is a vertical shaft 17, which has a bevel pinion 17d meshing with the bevel pinion 17b of shaft 16. The shaft 17 also has mounted on it, as stated, the pair of grooved pulleys 6. The combination just described furnishes a power drive for the belt 7.

Figure 1:
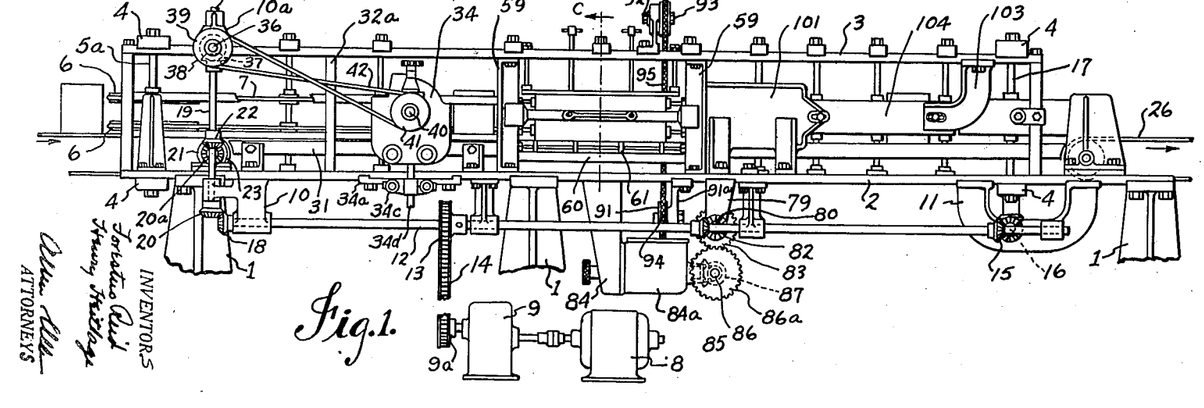
Figure 1 is a side elevation of a labeling unit for applying labels to a can body.
Figure 2:
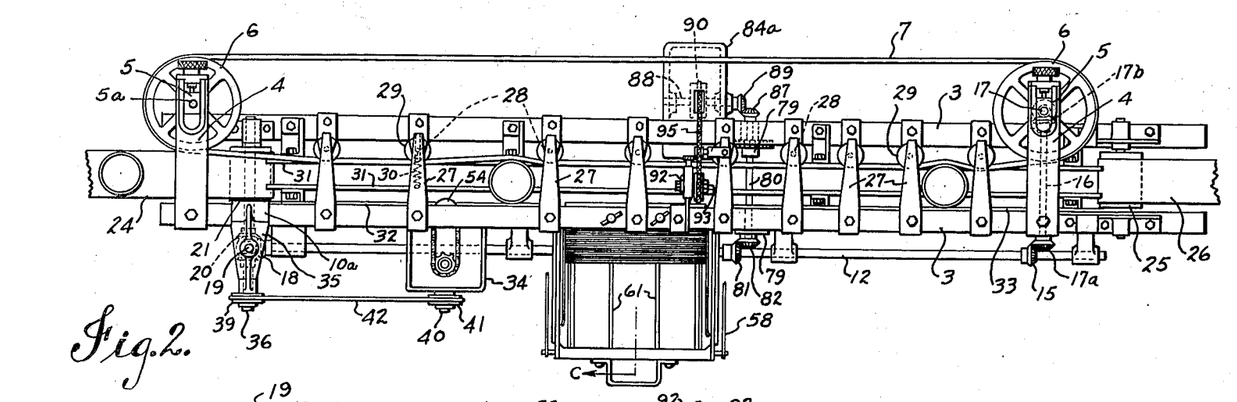
Figure 2 is a plan view of the labeling unit.

At the left hand end of the shaft 12 is a bevel pinion 18. Mounted in bracket 10 on the lower frame member 2 and in bracket 10a on upper frame member 3, is a vertical shaft 19, this shaft having on its lower end a gear 20, this gear 20 meshing with gear 18 on drive shaft 12. On shaft 20a, mounted transversely of the frame of the machine, is a roll 21 which is driven by bevel gear 22 on shaft 19, and gear 23 on shaft 20a. A belt 24 passes around this roll 21 and is the incoming supply belt for the machine. At the right hand end of the machine is a similar roll 25 carrying an outgoing delivery belt 26. Mounted on upper and lower frame members 2 and 3 are a series of brackets 27, these brackets being slotted on their under side for the reception of shafts 28 and their bearings, which are free to yield back and forth transversely under the control of springs 30. A series of grooved idler wheels 29 are mounted on the shafts 28 and form a yielding support for the belts 7. A pair of rail members 31 are mounted on brackets carried by the lower frame member 2 and these rails form a track for cans passing through the machine. At the front of the machine rail members 32 are carried by supports 32a, as shown in Figure 2, forming a sidewise guide for the cans on their way through the machine, the upper guide rail 32 being partly omitted in Figure 1 for the sake of clearness. Secured to the lower frame member is a bracket 34a which carries a pair of forwardly extending rods 34b, these rods passing through bearings 34c which, at their central portion, receive the support for a pair of short rods 34d which are screwed into the bottom portion of a glue pot 34.

Figure 6:
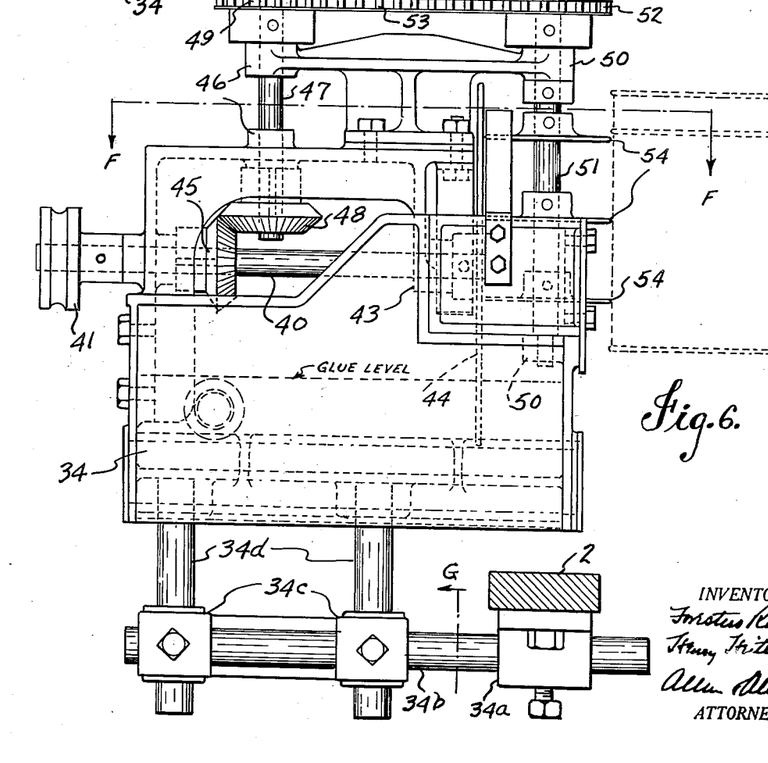
Figure 6 is a side elevation of one of the glue pots or adhesive applying units.
Figure 7:
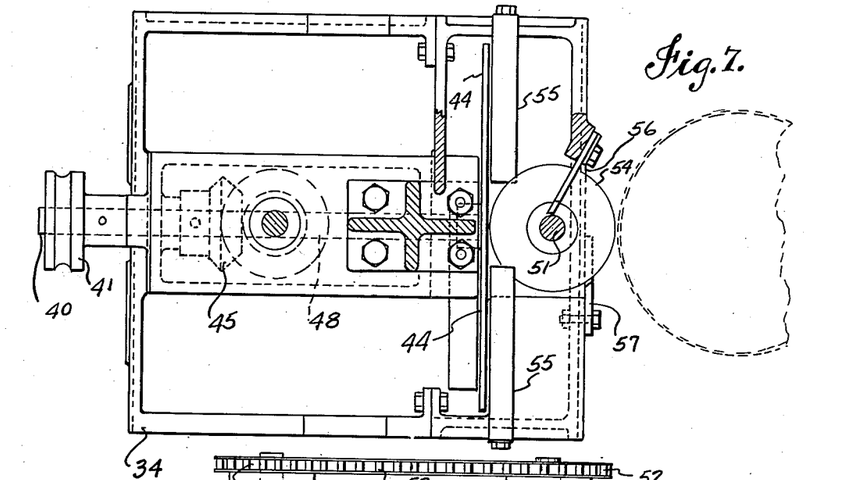
Figure 7 is a plan view of one of the glue pots or adhesive applying units, parts of the frame members being shown in section on line F of Figures 1, 3, 5 and 6.
Figure 8:
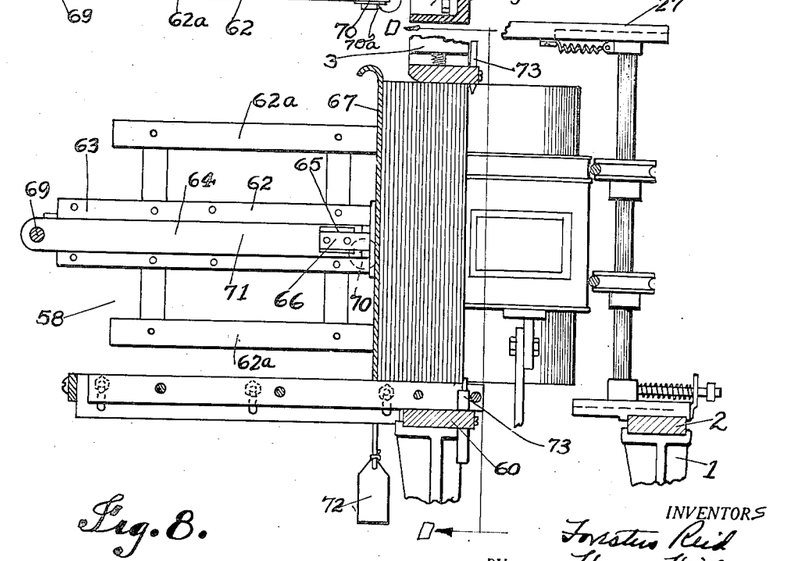
Figure 8 is a transverse section on lines C of Figures 1, 2, 3, 4 and 9 of a label or wrapper paper supply and feed unit.
Figure 9:
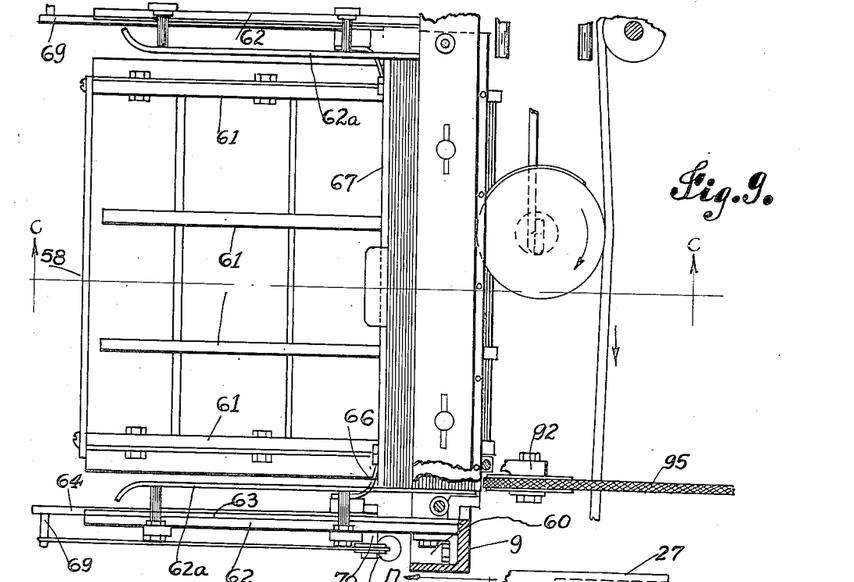
Figure 9 is a plan view of one of the label or wrapper paper feed units, parts of the frame member being broken away for clearness in illustration.
Figure 10:
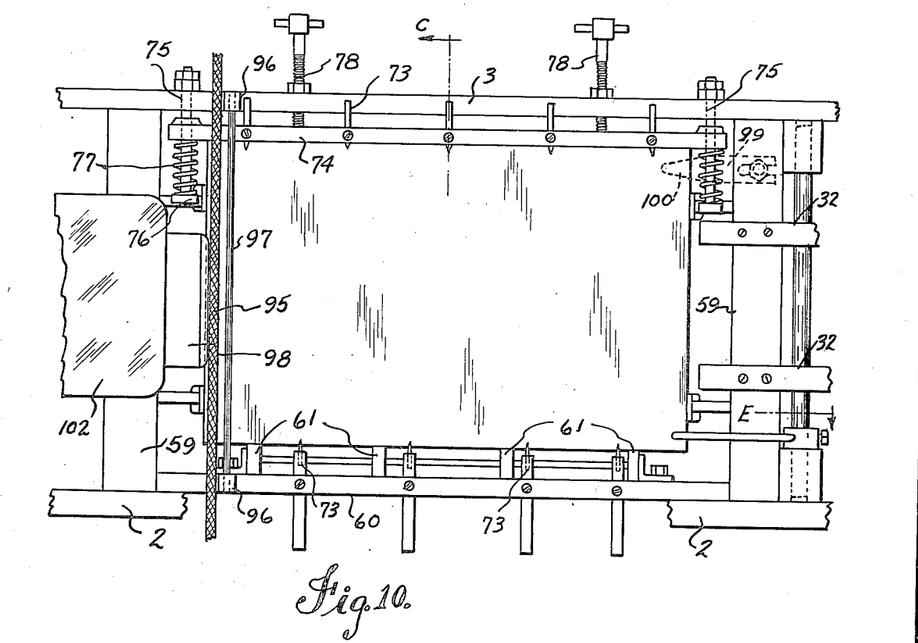
Figure 10 is an elevation of the discharge side of the label or wrapper paper feed units, and illustrates the paper holding devices and adhesive applying means.

The bracket 10a at the left hand end of the machine carries an extension bracket 35. Mounted in this extension bracket 35 is a shaft 36, having mounted on its outward end a bevel gear 37, which meshes with a bevel gear 38 on the shaft 19. On the outer end of the shaft 36 is a pulley 39. Extending transversely across the glue pot 34 and mounted in bearings thereon, as shown in Figure 6, is a shaft 40 having, on its left hand outer end, a grooved pulley 41. A belt 42 is mounted on the pulleys 39 and 41 and furnishes the driving means for the mechanisms within the glue pot 34. The shaft 40 passes through an inner bearing 43 in the frame of the glue pot 34, and has mounted thereon an adhesive supplying disc 44. The disc 44 extends down into the lower part of the glue pot and contacts with a supply of adhesive material therein. Mounted on the shaft 40, inside the frame of the glue pot 34, is a bevel gear 45.

Carried at the upper part of the glue pot is a pair of bearings 46. Supported in these bearings 46 is a vertical shaft 47 having secured to its lower end a bevel pinion 48, this bevel gear 48 being in mesh with the gear 45 on the shaft 40. At the upper end of shaft 47 is secured the sprocket wheel 49. On the right hand side of the glue pot 34, as indicated, there are a pair of bearings 50. Mounted in these bearings 50 is a vertical shaft 51, having secured on its outer, upper end a sprocket wheel 52. A sprocket chain 53 connects the sprocket wheels 49 and 52 in driving relationship. A series of adhesive delivery discs 54 are mounted in spaced relationship on the shaft 51, these discs 54 being separated slightly from the adhesive supplying disc 44.

Mounted on the walls of the glue pot 34 is a series of scraper bars 55 which extend across the face of the adhesive supplying disc 44 but which are not in bearing contact therewith, there being a small space between the bars 55 and the disc 44, so that as the disc is driven, a film of adhesive mixture will be left on the face of the disc 44. This film of adhesive will be sufficiently thick to come in contact with the edges of the adhesive delivery discs 54 and supply a film of adhesive to these discs. Should, however, there be an excessive amount of adhesive supplied to the delivery disc 54, scrapers 57, which are secured to the frame of the glue pot 34 and extend inwardly but do not come in contact with the adhesive delivery discs 54, leave a proper film of adhesive on the edges of these adhesive delivery discs 54.

In order that the adhesive material may be kept at proper consistency in all temperatures, there is provided in the side of the glue pot 34 an opening 57a through which may be inserted any of the commercial electrical heating units such as are provided for this class of work.

At about the center of the length of the labeling unit illustrated, and on one side thereof, is a self-feeding, label holder unit 58. The unit 58 may supply wrappers instead of the narrower labels, but it is to be understood that the construction of the unit 58 is in all essentials the same whether labels or wrappers are supplied.

Secured vertically between frame members 2 and 3 are a pair of supports 59. At the lower portion of these supports 59 and next to the frame member 2 is a longitudinal bar 60. Secured transversely to this bar 60 are a series of label respective support members 61. Secured to the middles of the support members 59 are guide bars 62 which have, in their inner faces, dove-tailed grooves 63. Sliding in the respective dove-tailed grooves 63 are slide members 64 of dove-tail cross section, which, at their inner ends, have respective blocks 65, to each of which is secured a flexible spring member 66. Each spring member bears against a respective lateral part of a feed plate 67, which in turn presses against the rear of a supply of labels carried within the label holder 58. Each guide bar 62 carries a pair of paper guides 62a which bear lightly against the respective lateral edges of the labels or wrappers. At the outer end of each dove-tailed slide member 64 is a stud 69. Secured to the guide bars 62 on studs 70 are pulleys 70a. Secured to stud 69 and passing over the pulley 70a is a cable member 71, depending from the pulley 70 and having secured at its lower end a weight 72.

The construction just described provides for a constant forward feed for the labels. In order that the labels may be removed from the front of the label holder, one at a time, it is necessary that they be freely, yet delicately, held within the label holder 58. The means provided for doing this will now be described.

Mounted in bar 60 is a series of adjustable needle pointed retention members 73. These members have their needle points so adjusted as to barely pass the lower edge of the supply of labels. At the top of the pile of labels is mounted an adjustable carrying bar 74 which is supported by studs 75 which are fastened in the frame member 3 and have, at their inward ends, each head 76. Between heads 76 and the bar 74 is a spring 77. Threaded through the frame member 3 and bearing against the bar 74 are a pair of adjusting screws 78. The bar 74 also carries a series of adjustable needle points 73, which project downward in the path of the labels. By means of the adjusting screws, this bar may be adjusted to the various positions necessitated by the varying widths of the label members. A pair of bearing brackets 79, as shown in Figure 1, are secured beneath the frame member 2. Mounted in the bearings of these brackets there is a shaft 80. Secured to the shaft 12 there is a bevel gear 81, which in turn meshes with a bevel gear 82 secured on the end of the shaft 80. At the opposite end of the shaft 80 there is a gear 83. Secured to the frame member 2 at the rear of the machine is a bracket 84, which supports an adhesive tank 84a. On the right hand side of the adhesive tank 84a bearing brackets 85 are mounted, which support a transverse shaft 86, the forward end of this shaft having secured to it a gear 86a which is in driving engagement with gear 83 and through gear 83 with the power shaft 12.

At the rear end of transverse drive shaft 86 is a bevel gear 87. The adhesive tank 84a has mounted within it, in bearings in its frame, a shaft 88 which extends outside the walls of the tank 84a and has secured on its projecting portion a bevel gear 89, which is in engagement with the bevel gear 87 of the transverse drive shaft 86.

Within the adhesive tank on the shaft 88 a driving pulley 90 is mounted. The lower portion of the driving pulley is in contact with the adhesive in tank 84a. On the frame members 2 and 3 are mounted bearing brackets 91 and 92 respectively, these bearing brackets carrying idler pulleys 93 and 94. Passing around the driving pulley 90 and extending over the idler pulleys 93 and 94 there is an adhesive distributing belt 95. When the labeling machine is in operation, this adhesive distributing belt 95 comes in contact with the adhesive in tank 84a and is coated thereby. Suitable scraper means is provided so that the coating of the belt 95 is in the amount necessary to perform its work. It will be noted in observing Figures 1, 2, 9, 10 and 11, that this adhesive distributing belt 95 passes straight down in front of the labels and label holder 58 at one end, and is in wiping contact with the edge of the outermost label towards the delivery end of the labeling machine. Inwardly from this belt on frame members 3 and 60 are mounted rod holders 96. Secured in these rod holders there is a rod 97 which passes vertically entirely across the opening of the label holder 58 and is in bearing contact with the first label of the holder close to one side of belt 95. On the opposite side of the belt 95 towards the delivery end of the label machine, we have provided a spring clip 98. The spring clip is in bearing contact with the extreme edge of the pile of labels retained within the holder 58.

Figure 16:
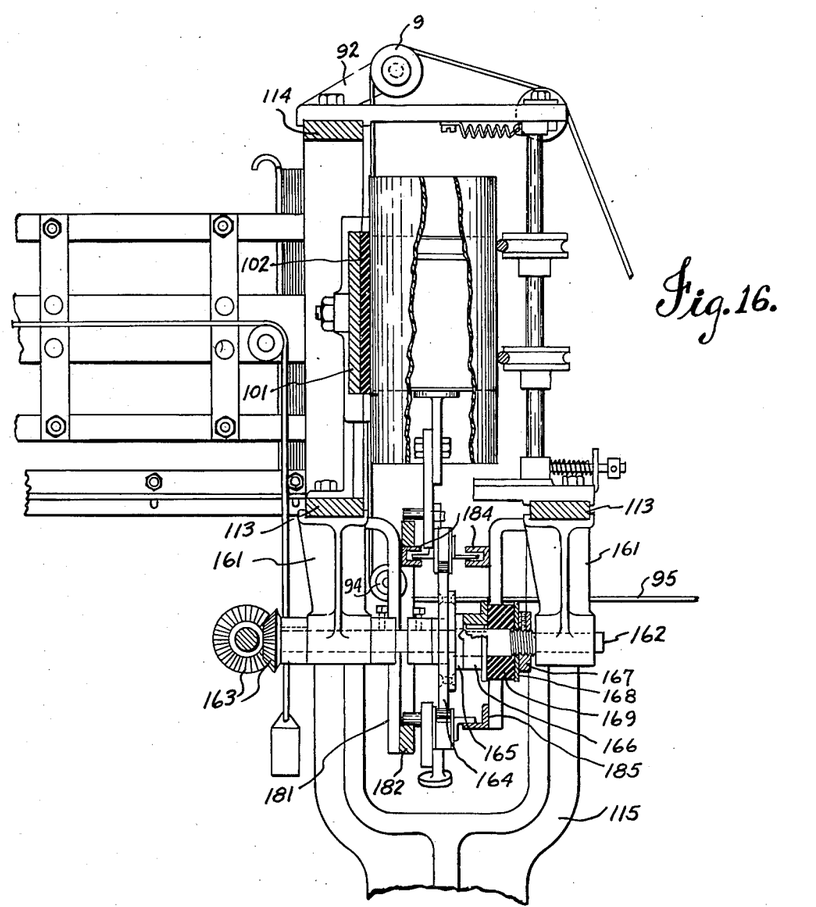
Figure 16 is a vertical transverse section on lines B—B of Figures 3 and 4, of the wrapper unit, and illustrates the clutch drive of the can supporting unit.
Figure 17:
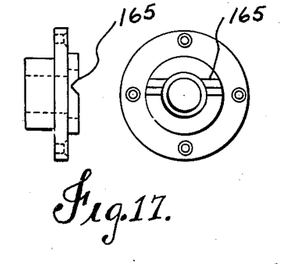
Figure 17 is a side and face elevation of the female clutch member.
Figure 18:
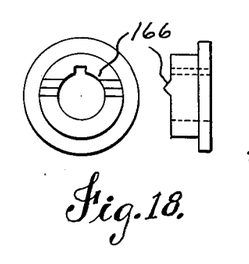
Figure 18 is a side and face elevation of the male clutch member.

Mounted on the bar 59 on the intake side of the label machine, is a light flexible holding member 100, which is secured to the bar 59 by a nut 99, and the inner end of the flexible member 100 is in bearing contact with the outermost label of the pile in the label holder 58. To the right of the label holder, as shown in Figure 1, a contact member 101 is mounted. The inner face of this contact member has a thick, soft, rubber pad 102 secured to it, as shown in Figure 16, this pad 102 being adapted, as the cans in the machine pass in front of it, to exert a yielding pressure against the outer surface of the labels, thus assuring their adhering to the surface of the cans. Secured to the right hand end part of upper frame member 3 is a bracket 103 which supports one end of a guide member 104, the other end of which is secured to the contact member 101.

The unit that has just been described in detail is for applying the designating labels to the canned products. The cans having been properly filled and their covers applied, are delivered to the machine by delivery belt 24, from which they are delivered to the track members 31. In this delivery, the side of the can comes in contact with the traveling belt 7 which attempts to force the can sidewise. This sidewise movement is resisted by side rails 32, and as there is enough pressure by the belt on the can body to cause it to roll in a vertical position along the track members 31 and against side rail 32, and since the normal space between the side rails 32 and the path of the belt is less than the size of the can body, the idler rollers 29 and their shafts yield rearwardly, thus keeping a steady pressure by the belts 7 on the can body at all times. The can then starts on its travel through the machine with a rotary motion on a vertical axis. As it passes the glue pot 34, as shown in Figure 1, the adhesive applying discs 54 deposit short narrow spots of adhesive on the sides of the can as seen in Fig. 6, and as the can passes on through the labeling machine, these adhesive spots come in contact with the innermost label of the label holder 58. This label promptly adheres to the side of the can. As the can continues its rolling action, there is enough pull to the adhesive on the can to release this innermost label from the spring clip 100 and the needle points 73. As the can continues its rotary traveling motion, the label is wound around the body of the can. The can finally passes the curl rod 97 and pulls the end of the label from beneath the adhesive belt 95. As this end is completely covered with adhesive, and as the pulling action of the can on the label past the rod 95 causes a slight curl to come into the label, the adhesive at once causes this end of the label to overlap and adhere to the opposite end of the label and thus completes the sealing of the label to the can. To insure a perfect contact between the adhesive, the label and the can, the can is then rolled past the soft rubber pad 102, with sufficient pressure to insure smoothing down of the label upon the can. The can then passes onward and is deposited by the belt 7 upon the delivery belt 26 where it passes onto the next unit of the combination, which is the can wrapping unit.

One of the features of our invention is in the provision for the insertion of an additional supply of labels or wrappers without stopping the machine. When the supply of labels reaches a minimum and it becomes necessary to replenish the supply, the additional labels are inserted in the label holder 58, to the rear of the feed plate 67, the new supply of labels having a feed plate 67, similar to the illustrated feed plate 67, at their rear. The slide members 64 are then pulled back, lifting the weights 72. The springs 66, which bear against the feed plate 67, being flexible, flatten out and recede to slide past the additional supply of labels until they pass the edge of the second feed plate 67, when they snap back into the position shown in Figure 9, bearing against the second feed plate 67, and, under the influence of the weights 72, again urging the labels forward.

The first feed plate 67 is now removed, and it will be observed that the forward feeding of the labels to the passing cans has been continued without interruption or the stoppage of the machine.

It is thus seen that the construction of our label holder permits the passage of cans to be labeled through the machine uninterruptedly for long periods.

*The can wrapping unit*

The power drive for the wrapping unit is similar to that of the labeling unit and consists of the motor driven unit 105, which drives the main power shaft 106 through a speed reduction unit, sprocket chain and sprocket gears. The power shaft 106 is connected by bevel gears to a cross shaft 107. Bevel gearing on the shaft 107 drives a vertical shaft 108 mounted in suitable bearing brackets carried by the lower frame members 113 and upper frame members 114. The frame members 113 and 114 are supported by the leg members 115. Keyed to vertical shaft 108 are grooved pulleys 109, forming a pair of driving pulleys. At the left hand end of the machine is a similar vertical shaft 110 having secured to it idler pulleys 111. This shaft is not power driven but free to revolve under the influence of belts 112 which are driven by pulleys 109. These belts 112, two in number, are in a line with the body of the cans that are to be passed through the machine for wrapping, and serve as the propulsion means therefor.

Driven by bevel gearing from the power shaft 106, at the receiving end of the wrapping unit, is a vertical shaft 116. The shaft 116 carries a bevel gear 117, which drives a roll 118, which in turn drives the belt 26, thus conveying the cans from the labeling unit. The belt 26 and the belts 112 travel at the same speed; therefore, when the cans carried by the belt 26 pass a point coinciding with the transverse central line of the pulleys 110, they are gripped by the belts 112 and are carried by a rotary motion forward into the wrapping machine, the opposite side of each can bearing against side rail members 119 (Figs. 11 and 12) which they pass in entering the wrapping machine and before they are gripped by the belts 112.

At the upper end of the vertical shaft 116 there is a wrist plate 120, carrying a wrist pin 121. To the right of vertical shaft 116, and mounted in bearings on the frame members 113 and 114, there is a vertical shaft 122 which has secured to it, on a line with the center of the height of the can, a notched disc 123, the notches of the disc being of a size to fit the body of a can.

Figure 12:
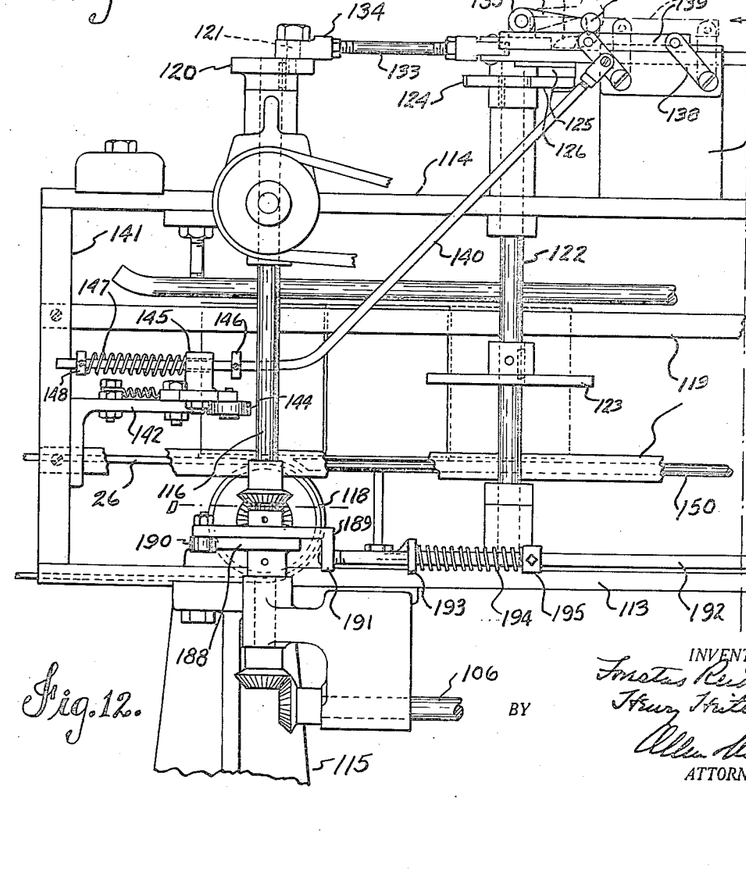
Figure 12 is a side elevation of the parts shown in Figure 11.

Secured near the top of the vertical shaft 122, as shown in Figure 12, is a ratchet disc 124. Mounted on the end of the vertical shaft 122 and above the ratchet disc 124, is a pawl arm 125 having a spring actuated pawl 126 secured to its under side and in engaging position with the teeth of ratchet disc 124. On the upper face of the pawl arm is a pin 127 which serves as an actuating member for the pawl arm 125.

Secured to the upper frame member 114 is a bracket member 128 supporting in a groove in its extending bracket member, a sliding bar 129 which, at the left hand end, has a forked portion 130, which engages a pin 127 of the ratchet pawl arm 125. Extending transversely from the sliding bar 129 is a latch lug 131. Slidably mounted in a second groove in the bracket 128 is a guide bar 132 which has connected to it a rod 133 which terminates in a bearing 134 that is mounted on the wrist pin 121. The guide bar 132, at its left end, has a bearing 135 which supports a gravity latch member 136. This latch member 136 has a stud carrying a roller 137 on one side.

The bracket 128 has a bar 139 secured to its outward face by pivoted links 138. Normally the links 138 stand in a vertical position, but under certain conditions may swing to the left and downward, carrying the bar 139 to a lower position, as will be later described.

Secured to one of the links 138 is a link rod 140. Bolted to a frame member 141 is a bracket 142 having mounted on it an angular swinging arm 143 which carries on one end, in the path of the moving cans, a roller 144, the opposite arm having an upward extension 145 having a hole therein for the passage of one end of the link rod 140. The link rod 140 has a collar 146 on the right of the upward extension 145, as shown in Figure 12, and a coiled spring 147 bears against the left face of the extension 145 and against a collar 148 on the end of link rod 140.

The operation of the mechanisms just set forth above will now be described.

Figure 4:
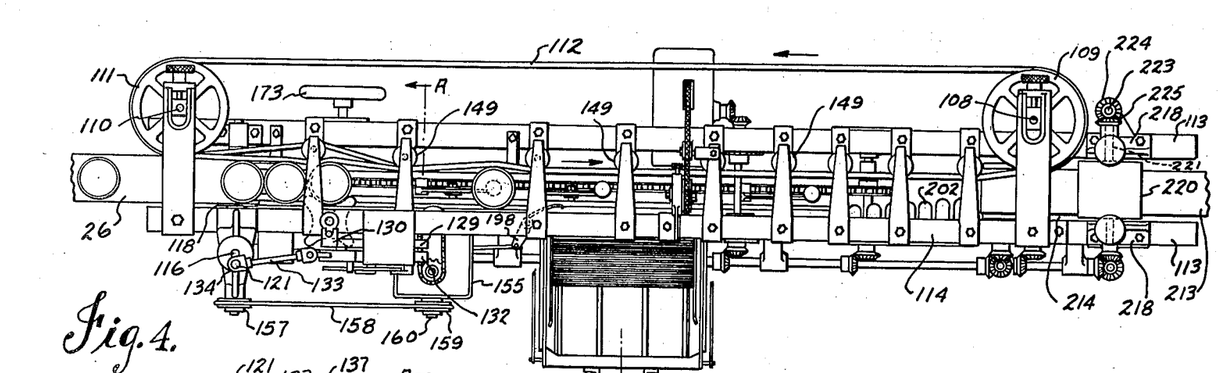
Figure 4 is a plan view of the can wrapper unit illustrated in Figure 3.
Figure 5:
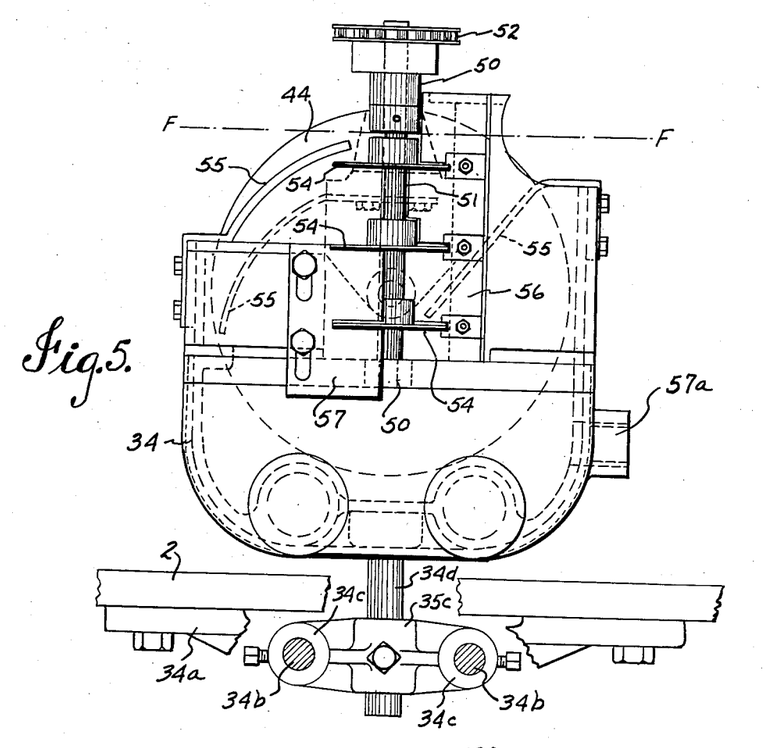
Figure 5 is a front elevation of the glue pots or adhesive applying units for the labeling and wrapping units.
Figure 13:
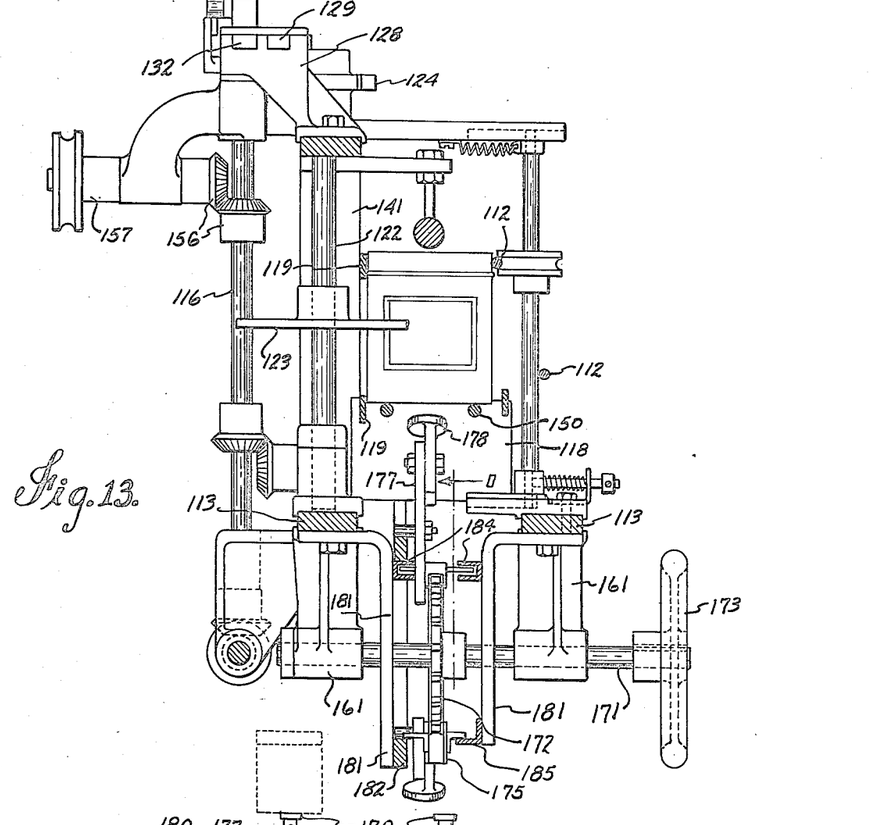
Figure 13 is a transverse sectional elevation of the receiving end of the wrapping unit, the section being on line A of Figures 3, 4, 11 and 12.
Figure 14:
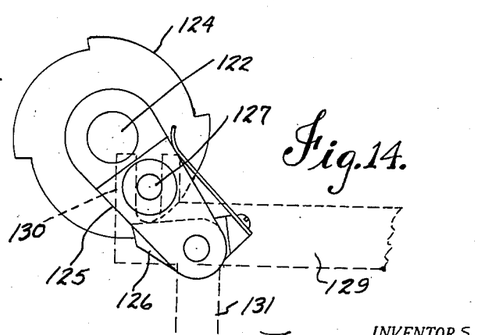
Figure 14 is a plan view of a detail of the can release mechanism.
Figure 15:
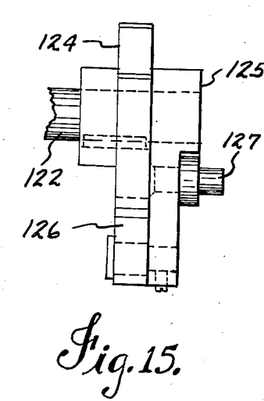
Figure 15 is a side elevation of the parts illustrated in Figure 14.

The cans being delivered by the belt 26 from the labeling machine are grasped by the belts 112 and move on into the wrapping machine. As they leave the belt, they are supported on rods 150, at their bottoms, these rods extending only to a point near the wrapper supply holder 187, as will be described later. Belts 112 are intermediately supported by yielding guide rollers 149, having the same construction as has been described for the same mechanisms in the labeling unit, and it is to be noted that the lower belt 112 is deflected and passes on the outside of the first yielding shaft, as is best seen in Figures 4 and 13. This is desirable so that if the can is stopped (as will be explained later), the sliding of the belt across the face of the label while the can is standing still, will be avoided, the upper belt being allowed to contact with the can at a point where there is no label, and its sliding action therefore not marring or wrinkling the label.

The shaft 116 makes one revolution for each revolution of the drive shaft 106; consequently the wrist plate 120 likewise makes the same ratio of turns. As the wrist plate 120 turns, the wrist pin 121 causes the rod 133 to move the guide bar 132 back and forth in the slot of the bracket 128, the roller 137 of the gravity latch 136 riding back and forth on the bar 139, and the gravity latch 136 being held in a non-effective position.

Figure 11:
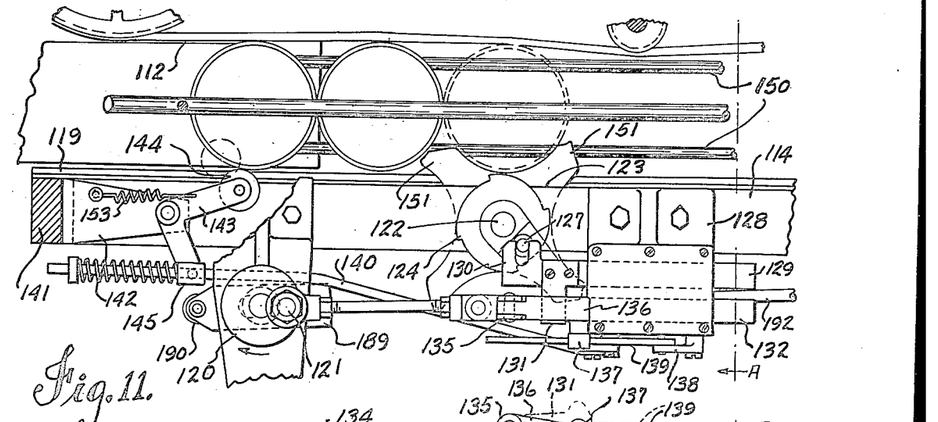
Figure 11 is a plan view of the left hand or receiving end of the wrapper unit and illustrating the timing mechanism and can retarding devices.

As a can passes further along into the wrapping machine, it reaches the notched disc 123 and is stopped thereby, the belt 112 continuing to urge the cans on without effect. As a second can reaches the stopped can, it, too, is stopped, its position being as indicated in Figure 11. In this position the roller 144 is held in a depressed position so long as the can is held. It should be noted that the depression of the roller 144 swings the angular arm 143 on its pivot and the upward extension 145 compresses the spring 147 against the collar 148 on the rod 140, causing this rod to swing the bar 139 downward from the position shown in dotted lines in Figure 12, to the position shown in full line, thus lowering the roller 137 on the gravity latch 136 and bringing the latch into the path of the transverse extending latch lug 131 of the sliding bar 129. If at the time the can depresses the roller 144, the position of travel of the wrist pin 121 be at a point where the gravity latch falls to the left of latch lug 131, nothing happens, the gravity latch riding idly to the left, and as the wrist plate passes the center and the latch again starts forward, the sloping end of the gravity latch 136 rides over the latch lug 131, thus lifting the gravity latch 136 momentarily; and as the right hand travel of the latch continues, drops it behind the latch lug 131.

As the wrist plate pin 121 again passes the center and the rod 133 again pulls the gravity latch to the left, the hooking of the latch over the latch lug 131 pulls the bar 129 to the left, the forked end 130 pushing the pin 127 to the left, and, by means of the pawl 126 and its engagement with the ratchet disc 124, giving the shaft 122 and notched disc 123 one quarter turn. As the notched disc 123 makes its turn, the can bearing against one of its fingers 151 passes into the notch of the disc and is carried to the position shown in dotted lines in Figure 11, the wrist 121 and its connections being then in a position to the left of its transverse center which is the reverse of the position shown in Figure 11. As the wrist 121 and its connections pass the left center and start forward, as shown in Figure 12, the latch member 136 in its lowered position on the sliding bar 132 immediately strikes the latch lug 131 and slides the bar 129 to the right with its fork 130 acting on pin 127 and retracting the ratchet arm 125 and its pawl 126 to the right as best seen in Fig. 4. At the extreme right of the movement, the pawl 126 is in position behind a ratchet tooth on the ratchet disc 124.

If a third can has not been delivered by the belt 26 to the wrapping machine, as the first can is moved into the notched disc 123 and is carried to the position shown in dotted lines in Figure 11, the second can moves forward and comes to rest in the position that was occupied by the first can against the point of finger 151 of the notched disc 123, releasing the roller 144, whereupon it is returned to the initial position by the spring 153. This movement causes the upward extention 145 of the angular arm to push against the collar 146, thus causing the rod 140 to move to the right and restore the bar 139 to its normal up position, thus lifting the gravity latch 136 free from the latch lug 131. As the wrist plate continues its turning, the sliding bar 132 moves back and forth in its slot in the bracket 128 and the roller 137 of the gravity latch 136 rides along the bar 139, and the forward and reverse travel of the parts will be without effect to turn the notched disc 123 so long as there be no third can present to depress the roller 144.

It can be seen from the preceding description of parts and operations, that just so long as the line of incoming cans consists of three or more, the notched disc passes with timed regularity, each can on for the further operations.

A can having been released by notched disc 123, is carried by belts 112 past a glue pot 155, having the same construction as that of glue pot 34 of the labeling unit. The glue pot 155 receives its power from shaft 116, bevel gears 156 (Fig. 13), drive pulley 157, belt 158 and to pulley 159 on the glue pot mechanism drive shaft 160.

Adhesive is applied to the can by adhesive applying discs, as is done by the adhesive applying discs 54 of the labeling unit.

As has been previously stated, can support rods 150 end at the edge of the wrapper supply unit, this being necessary since the wrapper papers are longer than the total height of the can. It then becomes necessary that a support for the cans be provided while the wrapper is being applied and that the support be individual for each can and further, that the support travel with the can until the wrapper is partially folded over the top and bottom of the can. It may be here stated that this traveling support has no part in causing the can to travel through the wrapping machine, that function being performed by belts 112 at all times until the can reaches the final delivery belt.

Supported by lower frame members 113 are bearing brackets 161, one of these brackets at the right hand end carrying a drive shaft 162 driven by bevel gearing 163 (Figs. 1 and 16) from the main drive shaft 106. Mounted on drive shaft 162 is a sprocket wheel 164, the hub of this sprocket wheel 164 having a female clutch member 165 bolted to it. Keyed to the drive shaft 162 and in engaging contact with the female clutch member 165, is a male clutch member 166. Held by a collar 167 fast on drive shaft 162, is plate 168, and in the space between the plate 168 and clutch member 166 is a soft rubber disc 169, this disc of rubber supplying a yielding element for the clutch members and permitting the drive sprocket 164 to stand idle in the event that any of the parts jam.

Bearing brackets 161 at the left hand end of the wrapping machine carry a shaft 171 having mounted at its center a second sprocket wheel 172. The shaft has on the outer end a hand wheel 173 for manual timing adjustment of the mechanisms now to be described.

Passing around the sprocket wheels 164 and 172 is a sprocket chain 174, this chain having in spaced relationship a series of bearing links 175, these bearing links having sidewise extending guide plates 176, best seen in Figs. 13 and 16. Mounted in the bearing links 175 are a series of curved arms 177, each arm carrying an adjustable stool portion 178 and having, near the center of its length, a slot 179. Adjustably secured in this slot is a roller or pin 180. Carried by a series of brackets 181 bolted to lower frame pieces 113, is a track member 182 having curved ends 183 which act as guides for the roller pins 180 on arms 177. Near the top of brackets 181 are channel members 184 which serve as a guide and track for the sidewise extending guide plates 176 on the bearing links 175. The rear bracket 181 has at its lower end an angle plate 185 forming a guide-way for one side of the bearing links, it not being necessary to support both sides of this link 175 at the lower plane of travel for the bearing links. An upper guide member 186 (Fig. 19) is provided for rollers 180 when they are in their upper path of travel.

As has been stated, the cans as they pass the wrapping paper supply must be carried by mechanism that will not interfere with the application of the wrapper paper. The mechanisms just described perform that function, as will now be set forth.

Figure 3:
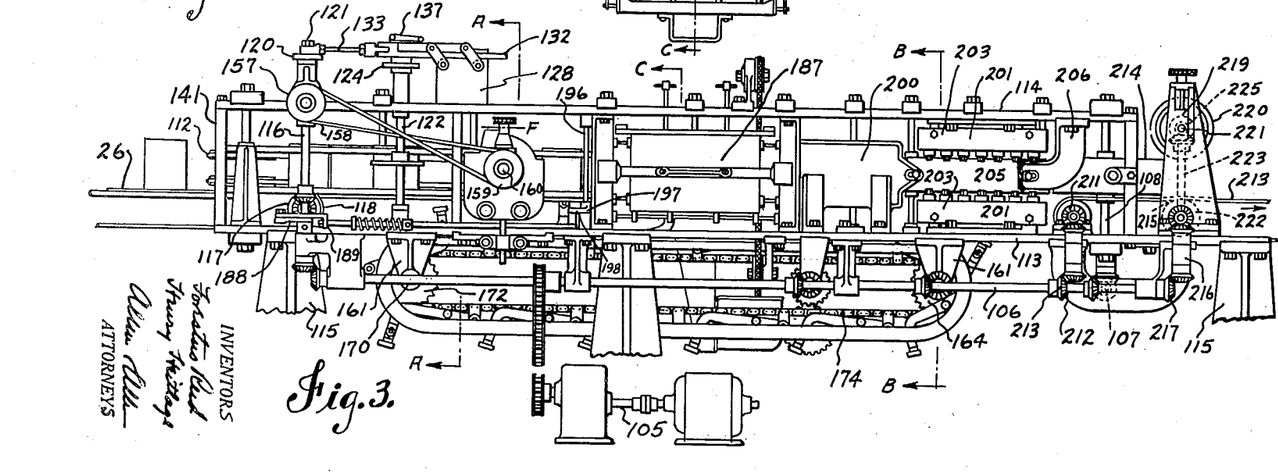
Figure 3 is a side elevation of a can wrapping unit, designed to receive cans from a labeling unit and apply a paper wrapper thereto.
Figure 19:
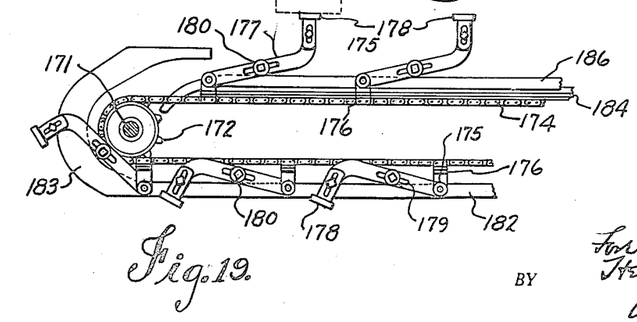
Figure 19 is a side elevation of the traveling can carrying mechanism.
Figure 20:
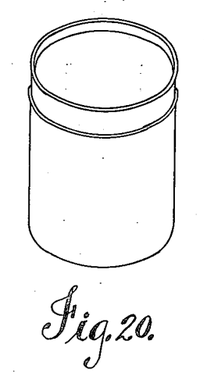
Figure 20 is a perspective view of a complete can without label or wrapper.

The travel of the stools 178 is in timed relation to the releasing of the cans by notched disc 123, because crank 120 is driven by the same shaft 105 that drives the stools Figs. 3 and 19 show that as the lower sprocket chain travels to the left (Fig. 13), the rollers on curved arms 177 ride along on guide track member 182, thus keeping the curved arms and their stools 178 in the retracted position shown in Figs. 3 and 19. When the arms and rollers reach the curved end 183, the rollers follow the contour of the curved end and when links 175 pass above the center of sprocket wheel 172, they drop onto the curved end of guide member 186 and carry up to the level portion of the guide member 186, to the position shown in Figs. 3 and 19. Just as the level portion of the guide member 186 is reached, the stools 178 on curved arms 177 come in contact with a can bottom, as is shown in Fig. 3, and as is shown by the dotted can in Fig. 19. The can and the stool members continue their travel in unison, the can at first being supported by the rails 150 and then by the stool 178. When the ends of rails 150 are reached, the stool members 178 continue to support the can until further operations are completed, as will be set forth. When the weight of the can and its contents come upon the stools 178, any tendency of sprocket chain 174 to sag under the load is prevented by the sidewise extending guide plates 176 on the bearing links 175 as they move along in the channel members 184. As the stools 178 reach a position well to the right of the wrapping paper supply, the rollers 180 on arms 177 follow the guide member 186 which, at the right hand end, also has a curved portion which guides the rollers and their arms onto the curved end of lower track member 182 as is to be seen in Fig. 3.

A can, having been released by notched disc 123, passes the adhesive applying discs in glue pot 155, and has adhesive applied to its surface, and the bottom of the can has come in contact with a carrying stool member. It is now ready to pick up a wrapper paper from the wrapping paper supply unit 187.

As has been stated, the wrapper supply unit 187 is in all respects identical with the one which has been described in detail for supplying labels to the cans as they pass through the labeling unit, the wrapping papers being held by the same adjustable needle points 73. They have adhesive applied to the lapping edge by an adhesive applying belt 95, and have a curl rod 97, as are found in the label holder unit 58. The spring clip 100 is, however, not present in the wrapping paper holder 155, there being in its place a retractable clip which will now be described.

Figure 23:
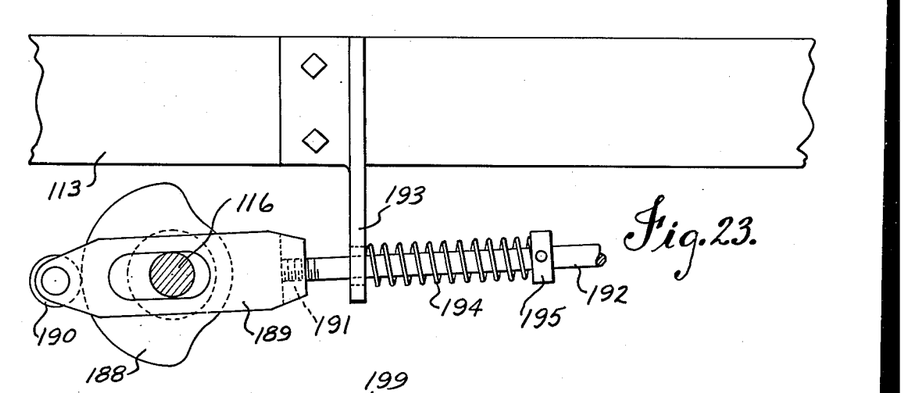
Figure 23 is a plan view of the cam and mechanism operated thereby, for the wrapper paper release, shaft parts being in section on line D of Figure 12.

Secured on vertical shaft 116 at the left hand end of the wrapping machine, as seen in Fig. 3, is a cam member 188, this cam member being a single lobed cam, as is best seen in Fig. 23. In contact with the cam on its upper face is a slotted member 189 having on its left end, in contact with the cam face, a roller 190. The right hand end of member 189 has a depending portion 191 into which is secured a rod 192, this rod passing through a supporting bracket 193. Surrounding rod 192 is a spring 194, which bears against bracket 193 and against a collar 195 secured to rod 192. This construction holds the roller 190 in engaging contact with cam 188 at all times.

Figure 24:
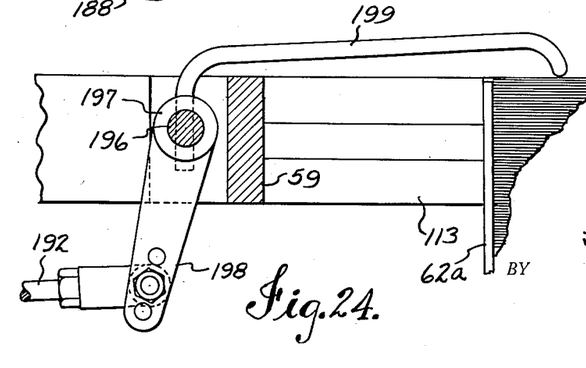
Figure 24 is a plan view of the paper release finger, parts in section being on line E of Figure 10.

To the left of wrapper supply unit 187 and mounted in bearings secured to frame members 113 and 114, is a vertical shaft 196; this shaft having secured near its lower portion by pinning, a hub 197, this hub having an outwardly extending arm 198, this outwardly extending arm being connected to the right hand end of rod 192 and operated thereby. Hub 197 has extending inwardly, a finger 199, this finger extending to the right in the path of the wrapper papers at their left hand edge, as shown in Figs. 3, 4 and 24. The finger 199 appears also in Fig. 10, and, since this is a face view of the wrapper paper unit 187, the finger 199 appears at the right hand side.

When the can body reaches the wrapper paper unit 187, the adhesive on the can body picks up the outermost sheet of the wrapper paper supply and, as the can body revolves, under the influence of belts 112, starts to wrap the wrapper paper around the can body. At the instant the near edge of a wrapper paper is picked up by the can body, the timing of finger 199 is such that the finger is retracted in an arc by the operation of the cam 188 as it turns, permitting the roller to move to the low part of the cam 188 and the spring urges rod 192 to the right, thus swinging finger 199 clear of the wrapper adhering to the can body. Just as soon as the edge of the wrapper paper is in the clear, the finger 199 is quickly returned to its position holding the near edge of the remaining wrapper papers from any possibility, through static influence or otherwise, of attempting to follow the wrapper paper adhering to the revolving traveling can body.

The can body continues its rotary travel to the right (Figs. 3 and 4) under the influence of belts 112, wrapping the wrapper paper around the can body.

When the far edge of the wrapper paper is reached, the adhesive having been applied by the same method and mechanism as was set forth for the label of the labeling unit, the continued travel of the can body, still supported on stools 178, carries the can body past a contact or smoothing unit 200, having a soft rubber pad to bear against the can body and its wrapper, as has been fully set forth in the description of a like contact or smoothing unit 101 on the labeling unit.

Figure 25:
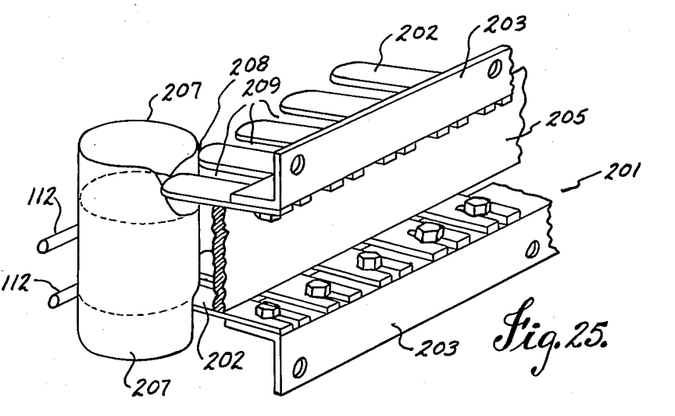
Figure 25 is a perspective view of the can wrapping paper folder fingers, some of the parts appearing in broken section.

When the can body and its wrapper have passed the length of the smoothing unit 200, the stool member 178 leaves the bottom of the can as the mechanism heretofore described starts down the curved track surface 182, the can immediately passing into the top and bottom wrapper folder units 201 (Figs. 3, 4 and 25).

The fingers 202 of these folder units are supported by angle bars 203, these angle bars being secured by bolts 204 to the upper and lower frame members 114 and 113 respectively. A guide plate 205 is carried by bracket 206 bolted to the upper frame member 114. This guide plate 205 is the same width as the can body and fills the space between the upper and lower folder fingers 202 of the folder unit 201. As the can body passes into the folder unit 201, the body of the can bears against this guide plate 205, and as the can body passes into channels formed by the top and bottom folder fingers 202 and guide plate 205, the extended portions 207 of the wrapper paper are struck by the first pair of fingers 202 and deflected against the top and bottom of the can body and, as the can continues its travel to the right, the edge 208 of the fold of wrapper paper extension 207 is caught by the next folding finger 202 and the slot 209 between the fingers, and thus, section by section, folding of the extended portions 207 of the wrapper paper continues until the can body has reached the end of folding unit 201.

Figure 22:
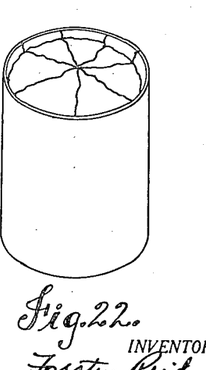
Figure 22 is a perspective view of a complete can, wrapped and ready for sale.

An inspection of Figure 22 shows the successive series of folds over the top portion of the can body. The bottom portion is similarly folded.

Figure 21:
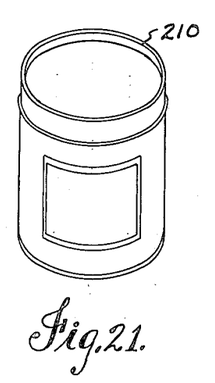
Figure 21 is a perspective view of a complete can with the label applied.

It is to be noted in Figure 21 that the top of the can illustrated has an upstanding rim 210, this rim being present at the bottom of the can body also, thus forming a depressed top and bottom portion.

At the right of folder unit 201 is a roll 211, this roll being carried in bearings on frame member 113 and driven by bevel gearing 212 from a bevel gear 213 on main drive shaft 106. This roll drives a delivery belt 213 upon which the cans are deposited as they leave the folding unit 201, belts 112 carrying the cans well onto the belt 213, as is shown in Fig. 4. The cans are kept central on this belt by side plates 214.

To the right beyond drive roll 211 and below the delivery belt 213 is a second roll 215, this roll being supported in bearings on frame member 113 and driven by a bevel gear drive 216 from a bevel gear 217 on the end of drive shaft 106. Carried on frame members 113 are a pair of brackets 218. Mounted in adjustable bearings 219 in the brackets 218, is a soft rubber roll 220, this roll having a rearwardly extending shaft 221. The roll 215 also has a rearwardly extending shaft portion having secured to it a bevel gear 222, this bevel gear 222 driving a bevel gear fastened on a vertical shaft 223, carried in bearing on rear bracket 218, the upper end of this vertical shaft 223 having a bevel gear 224 in engagement with the bevel gear 225 on roll shaft 221. The soft rubber roll 220 is thus driven from the drive shaft 106 by means of the bevel gear trains just described.

As the belt 213 carries the wrapped cans to the right, they pass between the lower roll 215, which is a hard roll, and the soft rubber upper roll 220, the folded wrapping paper on the ends of the cans being depressed tightly inside the rims 210, as shown in Fig. 22, thus locking the folds of the paper and delivering a neatly and tightly wrapped can.

After the cans pass through the rolls 215 and 220, they are carried by belt 213 to such other operations as they may require.

Having thus described our invention, what we claim as new and desire to secure by Letters Patent, is:—

1. A machine of the class described having in combination, guiding means for guiding cylindrical containers as said containers are conveyed through the machine, feeding means for intermittently admitting the containers to said machine, a belt receiving the containers from said feeding means and movable in a horizontal plane in such spaced position relative to said guiding means as to frictionally bear against the sides of containers in upright position and to cause said containers to be advanced with continuous rotary movement about vertical axes, said admitting means dependent for operation upon the presence of a definitely arranged group of containers thereat.

2. A machine of the class described having in combination, guiding means for guiding cylindrical containers as said containers are conveyed through the machine, conveying means for moving the containers through said machine comprising a belt movable in a horizontal plane in such spaced position relative to said guiding means as to frictionally bear against the sides of containers in upright position and to cause said containers to be advanced with continuous rotary movement about vertical axes, said means including a rising and falling bottom support for the containers.

3. In combination with a machine for wrapping cylindrical containers, a feed control comprising a pawl and ratchet driven wheel with notches of a size to fit containers being fed, a reciprocating eccentric drive for said pawl, an eccentric drive for said last mentioned drive, and stock actuated selective coupling means between said two last mentioned drives.

4. In combination with a machine for wrapping cylindrical containers, a feed control comprising a pawl and ratchet driven wheel with notches of a size to fit containers being fed, a reciprocating eccentric drive for said pawl, an eccentric drive for said last mentioned drive, and stock actuated selective coupling means between said two last mentioned drives so disposed that coupling only occurs when more than one container is in position for entry to the notched wheel.

5. A machine of the class described, having a conveyor provided with means contacting the circular ends of cylindrical containers only in areas spaced inwardly from their peripheries for supporting them in upright position while moving in a substantially horizontal path through the machine, means for continuously rotating the containers during their movement, and means for supporting a supply of container wrappers in vertical position with an outer wrapper exposed flatwise to contact with the sides of a container during its movement through the machine.

6. A machine of the class described, having a conveyor provided with means contacting the circular ends of cylindrical containers only in areas spaced inwardly from their peripheries and for moving the containers in upright position in a substantially horizontal path through the machine, and for permitting the continuous rotation of the containers during their movement, regulating means for enforcing travel of the containers in definite groups, means for supporting a supply of container wrappers in vertical position with an outer wrapper exposed flatwise and so located as to contact said wrapper with a container during its movement through the machine directly from said regulating means, said means for moving said containers comprising an endless belt moving in a horizontal plane and arranged to frictionally engage side walls of said containers.

7. In a machine for wrapping cylindrical containers with the wrappers extending beyond the circular ends of the containers, a conveyor comprising supports at intervals therealong, to engage circular ends of the containers and leave space for turning in the wrappers across said ends, a feeding device for feeding containers to said conveyor, and means effective for inhibiting said feeding device excepting when more than one container is on the conveyor in position to be placed thereby in correct position to be received by successively arriving supports of the conveyor.

8. In a machine for wrapping cylindrical containers in upright position with the wrappers extending beyond the circular ends of the containers, a conveyor comprising supports at intervals therealong, to engage the lower circular ends of the containers and leave space for turning the wrappers across said ends, a feeding device for feeding containers in upright position to said conveyor, and means effective for inhibiting said feeding device excepting when more than one container is on the conveyor in position to be placed thereby in correct position to be received by successively arriving supports of the conveyor.

9. In a machine for wrapping containers with wrappers extending beyond the ends of the containers, a conveyor comprising supports at intervals therealong, to engage ends of respective containers and leave space for turning the wrappers across said ends, and a feeding device for feeding said containers in definitely spaced groups whereby the containers will coincide with successively arriving supports of the conveyor.

10. In a machine for wrapping cylindrical containers with wrappers extending beyond the circular ends of the containers, a conveyor comprising supports at intervals therealong, to engage ends of respective containers and leave space for turning the wrappers across said ends, and a feeding device comprising means to extend partially around each one of a group of containers, said feeding device being effective to group said containers in definite arrangement to be received by said means, and being timed in relation to the operation of said conveyor to deliver the containers due to the partial extension of said means therearound, so that the containers will coincide with successively arriving supports of the conveyor.

11. In a machine for wrapping cylindrical containers with wrappers extending beyond the circular ends of the containers, a conveyor comprising supports at intervals therealong, to engage ends of respective containers and leave space for turning the wrappers across said ends, and a rotary device comprising means to extend partially around each one of a group of containers for advancing the containers toward a point of meeting with said supports, said device being effective to arrange the containers for the partial extension of the means around the respective containers, and being timed, in relation to the movement of said conveyor, so that containers advanced by said means coincide with the successively arriving supports of said conveyor.

12. In a machine for wrapping cylindrical containers with wrappers extending beyond their circular ends, a conveyor comprising supports at intervals therealong, to engage ends of respective containers and leave space for turning the wrappers across said ends, means for feeding containers at timed intervals to coincide with successively arriving supports of the conveyor, means to apply the wrappers around the containers with portions extending beyond said ends as aforesaid, means to turn said portions across said ends, and means between which the containers pass, with their ends presented to said means to press the turned portions of the wrappers to the ends.

13. A machine as set forth in claim 12, in which the means between which the containers pass for pressing the turned portions of the wrappers to the ends of containers comprises two rollers, one at least of which is of soft material, to indent the turned portion of the wrapper into a depression in the end of the container, said roller of soft material being positively driven in addition to the driving of the container between the rollers.

14. A machine of the class described having a conveyor provided with means for individually engaging cylindrical containers only within their circular end areas to hold them in an upright position while moving in a substantially horizontal path through the machine, means for continuously rotating the containers during their movement, means for supporting a supply of container wrappers in vertical position with an outer wrapper exposed flatwise to contact with the areas of the containers other than the aforementioned areas during their movement through the machine by said individually engaging means and means for regulating the order of approach of said containers through said engaging means.

FORESTUS REID.
HENRY HEITLAGE.